GLOVER & RICHARDSON.
Harvester.
No. 22,772.
2 Sheets—Sheet 1.
Patented Jan'y 25, 1859.
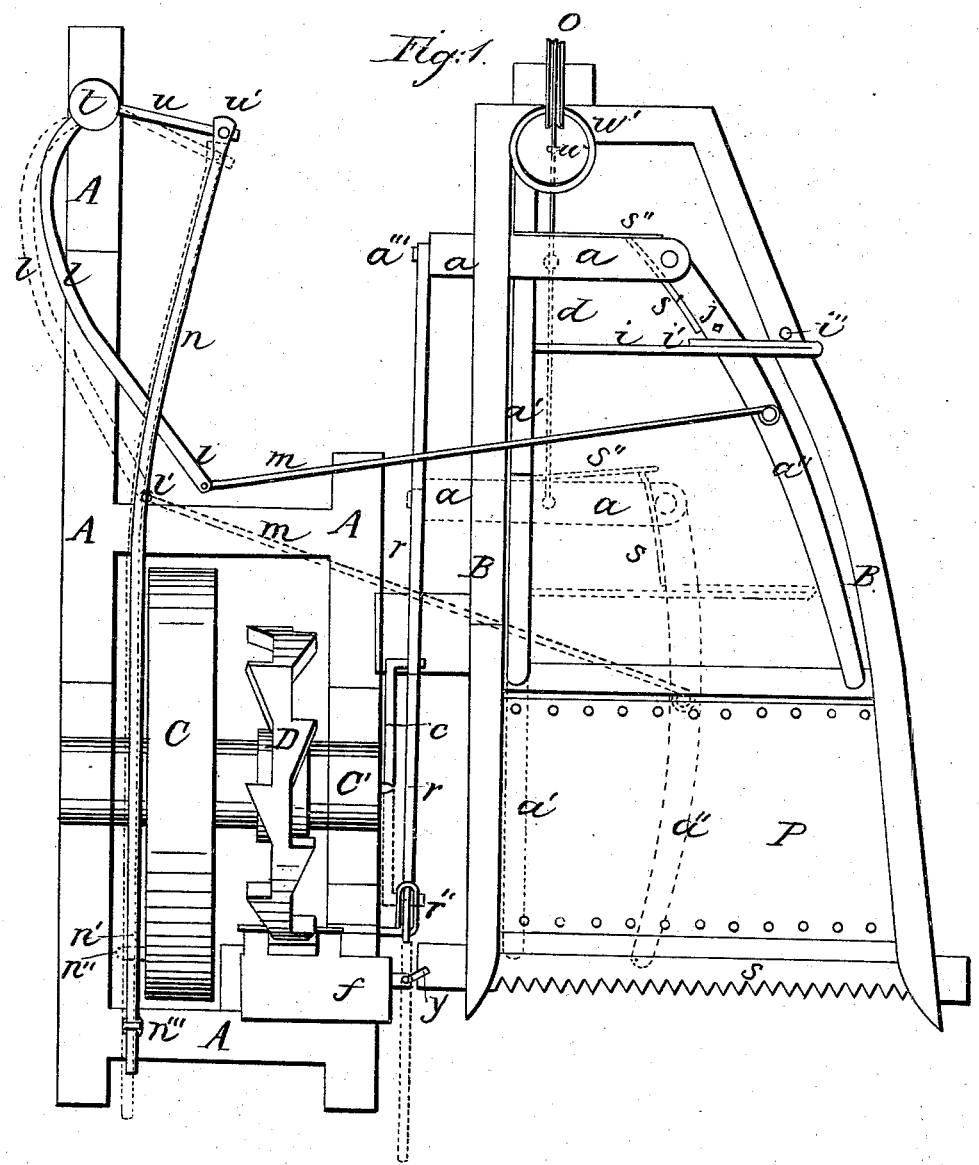

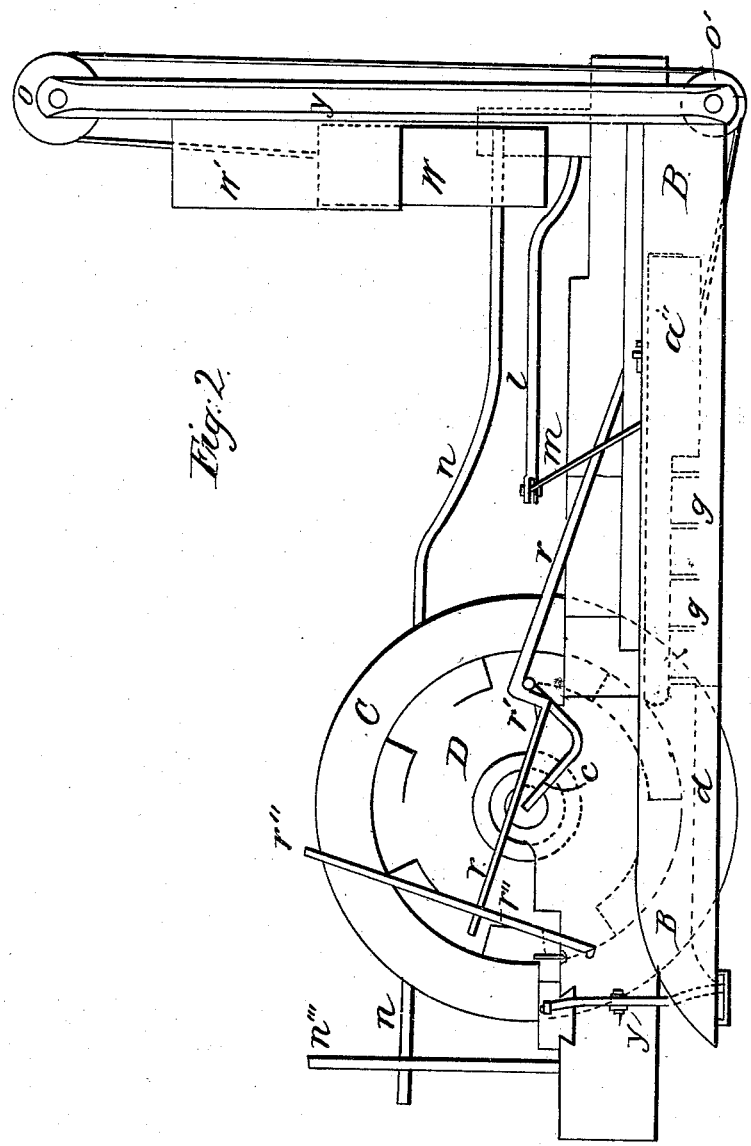

UNITED STATES PATENT OFFICE.

G. W. RICHARDSON AND ROBERT GLOVER, OF GRAYVILLE, ASSIGNORS TO THEMSELVES, AND J. B. WILLIAMS AND WM. A. HORRALL, OF WHITE COUNTY, ILLINOIS.

IMPROVEMENT IN HARVESTERS.

Specification forming part of Letters Patent No. 22,772, dated January 25, 1859.

*To all whom it may concern:*

Be it known that we, G. W. RICHARDSON and ROBERT GLOVER, of Grayville, in the county of White and State of Illinois, have invented a new and useful Improvement in Harvesters; and we do hereby declare that the following is a full, clear, and exact description thereof, reference being had to the accompanying drawings and letters of reference marked thereon, making part of this specification.

Similar letters refer to like parts.

Our invention refers to certain improvements in machinery for raking in harvesters, hereinafter described, by means of which we are enabled to gather the cut grain into sheaves upon the platform and deposit the same upon the ground behind the platform as the machine moves forward.

Figure 1 is a plan of our improvement as shown from the top, representing the raker as being returned from the platform in its position at rest after having deposited the grain, and also in red lines at that period of its operation when it has grasped the grain and is ready to be returned from the platform. Fig. 2 is a side elevation, showing specially the devices for operating the raker and the peculiar construction of its jointed spring-arm.

A is the frame-work for the driving machinery.

B is the raker-frame, attached in the usual manner to the frame A.

C is the driving-wheel.

D is a cam-wheel for operating the sickles.

C' is a shaft, to which the wheels C D are attached.

$p$ is a platform, constructed in the usual way, for the reception of the cut grain.

$a\ a'\ a''$ is the raker, the two longitudinal arms $a'\ a''$ being provided on a portion of their under sides with teeth $g$, Fig. 2, to facilitate the gathering, grasping, and withdrawing of the cut grain from the platform $p$. The jointed spring-arm $a''$ of the raker is pivoted to the transverse bar $a$ of the raker in such manner as allows lateral motion to its forward end, and at its heel, on its inner side, is provided with a spring, $s'$, which projects beyond its pivoted end, and upon the outer side of the bar $a$ of the raker is attached a spring, $s''$, by means of which springs $s'\ s''$ the arm $a''$ is forced outwardly when the raker is in position to deposit the grain. The bar $a$ of the raker extends across the inner part of the frame B (a suitable depression being formed therein, in which the said bar may traverse) to the point $a'''$.

$i$ is a spring-catch firmly attached to the arm $a'$ of the raker, and extending outwardly across the arm $a''$ and frame B, and formed with a catch, $i'$, so that as the raker is moved forward and the arm $a''$ is contracted the catch $i'$ clutches the projection $j$ of the arm $a''$ and secures said arm in that contracted position until the return of the raker to the point of depositing grain, when the projection $i''$ of the frame B arrests the spring $i$, relieves the projection $j$ from the catch $i'$, and allows the arm $a''$ to be thrown outwardly by means of the springs $s'\ s''$, as before described.

$r$ is a rod, formed with the catch $r'$, attached to the bar $a$ of the raker at $a'''$, and extending forward longitudinally across the machine to the rest $r''$.

$c$ is a crank attached to the shaft C', and thereby made to revolve in harmony with the driving-wheel C.

$t$ is a shaft inserted into the frame A in such manner as to allow rotation.

$u$ is an arm attached to the shaft $t$, and extending inwardly in the direction of the frame B to the point $u'$, at which is pivoted the rod $n$, which extends forward to the rest $n'''$. The rod $n$ is provided upon its under side with a catch at $n'$.

$n''$ is a pin inserted into the outer face of the driving-wheel C, and made to carry the rod $n$ forward by means of the catch at $n'$ at each revolution of the wheel C.

$l$ is a bent lever attached to the shaft $t$, and formed to curve inwardly in the direction of the frame B to the point $l'$, to which is pivoted the rod $m$, which extends across the machine and is attached to the arm $a''$ of the raker.

$w$ is a weight arranged to return the raker from the platform $p$.

$w'$ is a casing in which the weight $w$ moves up and down.

$d$ is a cord attached to the bar $a$ of the raker, and extending over pulley-wheels $o'\ o$ to the weight $w$.

$y$ is an upright post, formed to give sufficient elevation for the operation of the weight $w$.

$f$ is a sliding bar, made to operate the sickle $s$ by means of the cam-wheel D and rod $y'$.

The operation is as follows: The driving-wheel C being made to rotate forward, the crank $c$ catches the rod $r$ at $r'$, by means of which the raker $a\ a'\ a''$ is drawn forward and the weight $w$ elevated when the raker has reached a position upon the platform adapted to its grasping the grain. The pin $n''$ of the driving-wheel C catches the rod $n$ at $n'$, draws it forward and produces partial rotation of the shaft $t$, which rotation forces the bent lever $l$ outward, and by means of the rod $m$ contracts the arm $a''$ of the raker to the position shown by the red lines in Fig. 1, in which position it is secured by means of the spring-catch $i$, as above described. The wheel C still continuing to rotate, the rod $n$ is arrested by the rest $n'''$ and the pin $n''$ released from the catch at $n'$. The rod $r$ is now arrested by the rest $r''$, which releases the crank $c$ from the catch $r'$. The raker $a\ a'\ a''$, now being free, is returned by the weight $w$, with its freight of cut grain, to the point of deposit, at which point the spring-catch $i$ is arrested by the projection $i''$ of the frame B, the projection $j$ relieved from the catch $i'$, and the arm $a''$ forced to expand by means of the springs $s'\ s''$. The grain is thus deposited and the raker is again ready to go on with its work.

What we claim as our invention, and desire to secure by Letters Patent, is—

1. The jointed spring-arm $a''$, arranged and operating in the manner and for the purposes set forth, in combination with the spring-catch $i\ i'$, operating so as to catch and hold the arm $a''$ when it has gathered the grain, and retain it in this position until the bundle is ready to be deposited free from the platform $p$.

2. The raker $a\ a'\ a''$, in combination with the rod $r$, crank $c$, rest $r'''$, and retracting-weight $w$, arranged and operating to produce the reciprocating movements for gathering and delivering the gavel, in the manner described.

3. In combination with the arm $a''$, the connecting-rod $m$ and bent lever $l$, operated through the medium of rod $n\ n'$, pin $n''$, and rest $n'''$ by the driving-wheel C, substantially in the manner and for the purposes set forth.

GEORGE W. RICHARDSON.
ROBERT GLOVER.

Witnesses:
M. M. DOYLE,
M. V. MILSEY.